(12) United States Patent
Hari Haran et al.

(10) Patent No.: US 12,289,437 B2
(45) Date of Patent: Apr. 29, 2025

(54) ELECTRONIC DEVICE, SERVER AND METHODS FOR VIEWPORT PREDICTION BASED ON HEAD AND EYE GAZE

(71) Applicant: Telefonaktiebolaget LM Ericsson (publ), Stockholm (SE)

(72) Inventors: Alvin Jude Hari Haran, Sundbyberg (SE); Chris Phillips, Hartwell, GA (US); Gunilla Berndtsson, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 17/782,414

(22) PCT Filed: Dec. 9, 2019

(86) PCT No.: PCT/EP2019/084201
§ 371 (c)(1),
(2) Date: Jun. 3, 2022

(87) PCT Pub. No.: WO2021/115549
PCT Pub. Date: Jun. 17, 2021

(65) Prior Publication Data
US 2023/0011586 A1 Jan. 12, 2023

(51) Int. Cl.
H04N 13/349 (2018.01)
H04N 13/371 (2018.01)
H04N 13/383 (2018.01)

(52) U.S. Cl.
CPC ......... H04N 13/349 (2018.05); H04N 13/371 (2018.05); H04N 13/383 (2018.05)

(58) Field of Classification Search
CPC .. H04N 13/349; H04N 13/371; H04N 13/383; H04N 13/117; H04N 21/2343;
(Continued)

(56) References Cited

U.S. PATENT DOCUMENTS 10,419,738 B1    9/2019  Phillips et al.
2016/0260196 A1* 9/2016  Roimela ............ G02B 27/0172
(Continued)

FOREIGN PATENT DOCUMENTS

GB    2557416 A  *  6/2018  .............. G06F 3/011

OTHER PUBLICATIONS

Hirotake Yamazoe et al., "analysis of head and chest movements that correspond to gaze directions during walking", © Springer-Verlag GMBH, GE, Feb. 28, 2019 (Year: 2019).*
(Continued)

Primary Examiner — Dramos Kalapodas
(74) Attorney, Agent, or Firm — Sage Patent Group

(57) ABSTRACT

A method performed by an electronic device for requesting tiles relating to a viewport of an ongoing omnidirectional video stream is provided. The ongoing omnidirectional video stream is provided by a server to be displayed to a user of the electronic device. The electronic device predicts for an impending time period, a future head gaze of the user in relation to a current head gaze of the user, based on: A current head gaze relative to a position of shoulders of the user, a limitation of the head gaze of the user bounded by the shoulders position of the user, and a current eye gaze and eye movements of the user. The electronic device then sends a request to the server. The request requests tiles relating to the viewport for the impending time period, selected based on the predicted future head gaze of the user.

18 Claims, 9 Drawing Sheets

Method in electronic device 120

(58) Field of Classification Search
CPC ....... H04N 21/2393; H04N 21/440245; H04N 21/44218; H04N 21/44224; H04N 21/4728; H04N 21/6587; H04N 21/816; H04N 21/21805; G02B 27/0093; G06F 3/011

See application file for complete search history.

(56) References Cited

U.S. PATENT DOCUMENTS

| | | | |
|---|---|---|---|
| 2018/0004285 A1* | 1/2018 | Castleman | G11B 20/10527 |
| 2018/0300098 A1* | 10/2018 | Vembar | G06F 3/1431 |
| 2019/0147607 A1 | 5/2019 | Stent et al. | |
| 2021/0006767 A1* | 1/2021 | Phillips | H04N 13/161 |
| 2021/0125411 A1* | 4/2021 | Choi | G06F 3/011 |
| 2022/0182594 A1* | 6/2022 | Phillips | H04N 13/194 |

OTHER PUBLICATIONS

International Search Report and Written Opinion of the International Searching Authority for PCT International Application No. PCT/EP2019/084201 dated Jul. 29, 2020.

Yamazoe et al., "Analysis of head and chest movements that correspond to gaze directions during walking," Experimental Brain Research (2019), Spring International, vol. 237, No. 11, pp. 3047-3058.

* cited by examiner

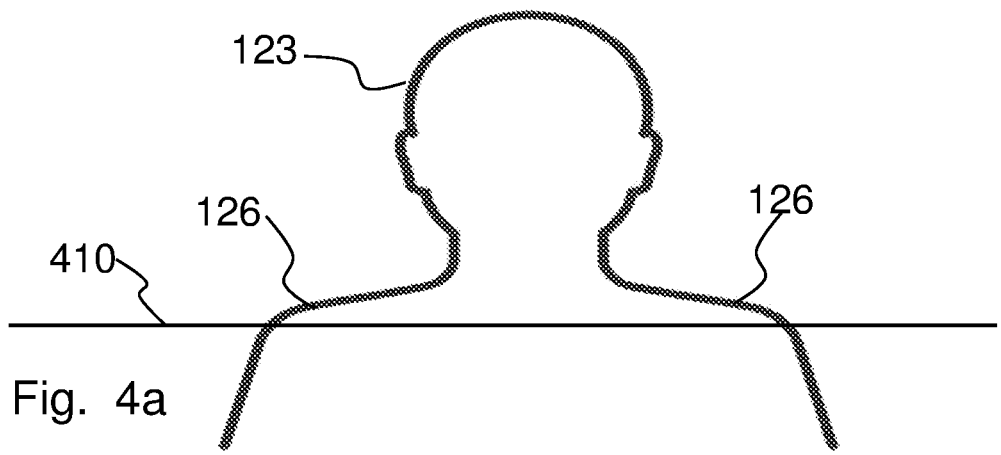
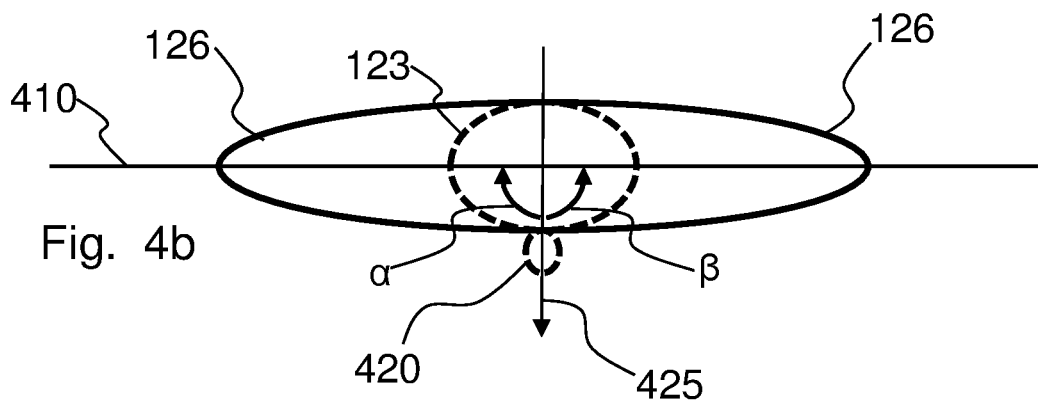
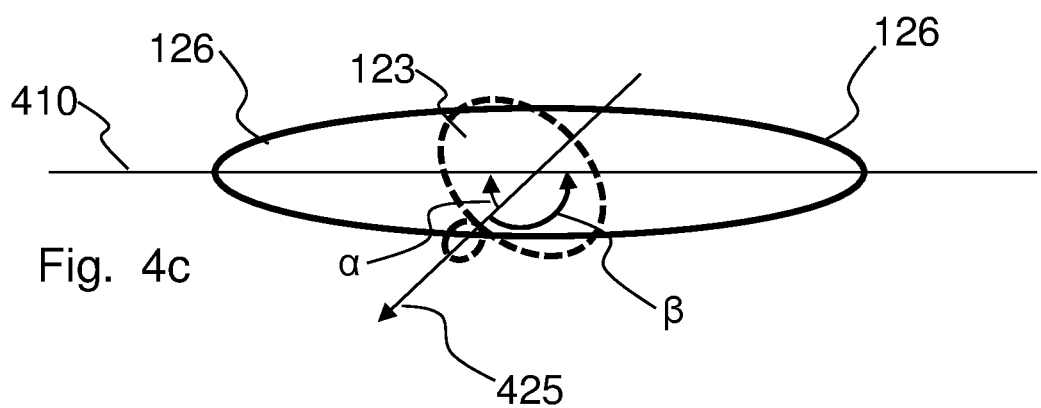

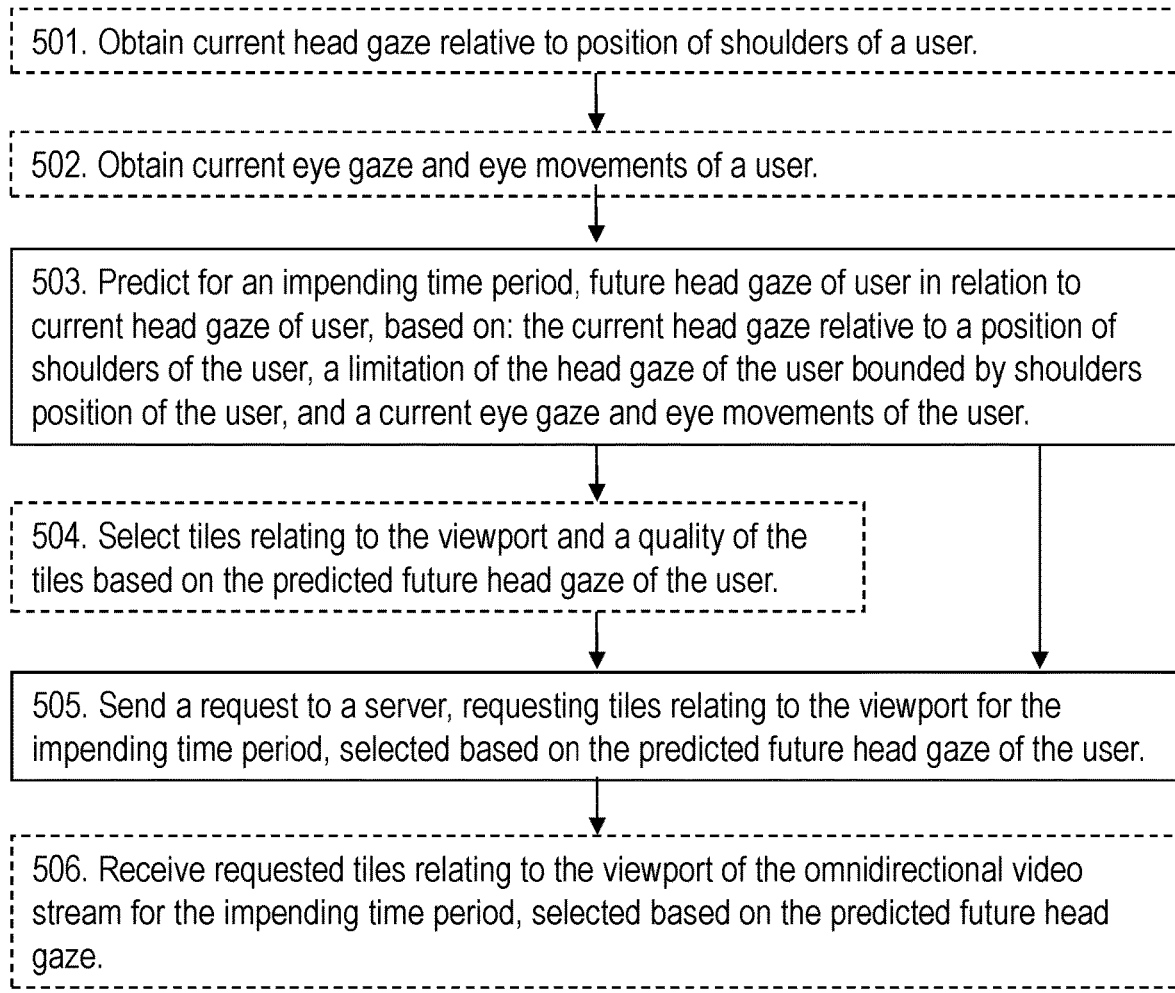
Fig. 5 Method in electronic device 120

601. Receive request from an electronic device, requesting tiles relating to a viewport for an impending time period and comprising a future head gaze of a user.

602. Select for an impending time period, the requested tiles relating to the viewport, based on the predicted future head gaze of the user.

603. Send to the electronic device, the selected tiles relating to the viewport of the omnidirectional video stream for the impending time period.

604. Buffer the selected tiles relating to the viewport of the omnidirectional video stream for the impending time period.

Fig. 6  Method in server 130

ELECTRONIC DEVICE, SERVER AND METHODS FOR VIEWPORT PREDICTION BASED ON HEAD AND EYE GAZE

CROSS REFERENCE TO RELATED APPLICATION

This application is a 35 U.S.C. § 371 national stage application of PCT International Application No. PCT/EP2019/084201 filed on Dec. 9, 2019, the disclosure and content of which is incorporated by reference herein in its entirety.

TECHNICAL FIELD

Embodiments herein generally relate to an electronic device, a server and methods therein. More specifically, they relate to requesting tiles relating to a viewport of an ongoing omnidirectional video stream.

BACKGROUND

Virtual Reality (VR) video has become very popular. However, streaming omnidirectional video such as e.g. Virtual Reality (VR) 360 video, or panoramic video, over communications networks requires a lot of bandwidth for delivering an acceptable quality video stream that is responsive to a user's head movements. A poor bandwidth thus results in a low quality image. To solve this, tiled streaming may be used which results in a better quality video stream.
Tiled Video Streaming Tiled video streaming enables distribution of VR content and is a method that is used to decrease the need of bandwidth. In tiled video streaming the image is divided into tiles, and only the tiles that are in view of the user are streamed, and these tiles have a very high quality.

Tiled Streaming works in client server way. Software in a client retrieves only tiles that are actually visible in the HMD. The panoramic video may be encoded in industry-standard encoders. There may be hundreds of such visible tiles. These tiles are motion constrained tiles, and are independently coded and stored independently per frame in a server such as e.g. a Content Distribution Network (CDN) server. The tiles are retrieved by the client and assembled into a frame to send to the decoder. The client has the logic to request the tiles it needs, decode them, and then rearrange them for rendering on the device the user uses for watching the video.

There is also a lower resolution version of the panorama that always may be transmitted. This layer ensures that there are no black holes when the user turns his/her head. When the user moves his/her attention to a different part of the panorama, the device needs to fetch new content from the network. While this happens very fast within millisecond, it still takes a bit of time. The lower resolution layer ensures there are no black holes while new tiles are fetched, and also takes care of an incredibly short motion-to-photon delay. That delay only depends on the local processing.
Biometric Adaptive Video Streaming A Virtual Reality Head Mounted Device (VR HMD) is a device a user may use for watching 360 videos. As mentioned above, although the content itself is 360 degrees, only a part of it can be viewed at a specific time, i.e. the region that is in the VR HMD's viewport. FIG. 1 schematically shows how an image 10 is divided into tiles 12 in a tiled video streaming, and only the tiles that are in view of the user are streamed. These streamed tiles are the tiles in a so called viewport 14.

The video is streamed from a remote server, and as mentioned above, sending the full 360 video is a waste of bandwidth and only the portion that is viewable, needs to be streamed. If and when a user, i.e. the viewer, moves his/her head, then the corresponding area, i.e. the viewport 14, is streamed down in higher resolution. Since this requires a very high response time, it is common to stream more than strictly fits into the viewport. This domain attempts to understand how to save bandwidth while preserving user experience especially in cases where the user moves his/her head. The wording "tiles related to a viewport" means a video stream including more than strictly fits into the viewport.

There are e.g. three known ways to do this. 1) Stream full 360 in low resolution and overlay the viewport with high quality tiles requiring two decoders. 2) Retrieve low resolution tiles for outside the viewport and high quality tiles for the viewport requiring one decoder. 3) In one server approach tiles are weighted and multiple qualities of tiles where each tile has a weight. The highest quality tiles are selected based on the highest weights. These tiles are assembled into a frame at the server for each frame to be delivered to the client.

The method to stream down in higher resolution only the area corresponding to how the viewer moves his/her head may be based on sensors that senses these movements and may be referred to as biometric adaptive video streaming.

Streaming a lot more than fits into a viewport requires more bandwidth, streaming too little has the risk that viewers will briefly see no content or low-resolution content for a brief moment when they quickly move their head.

SUMMARY

An object of embodiments herein is to improve the experience for a user and decrease requirement of bandwidth when streaming omnidirectional video in a communications network.

According to an aspect of embodiments herein, the object is achieved by a method performed by an electronic device for requesting tiles relating to a viewport of an ongoing omnidirectional video stream. The ongoing omnidirectional video stream is provided by a server to be displayed to a user of the electronic device. The electronic device predicts for an impending time period, a future head gaze of the user in relation to a current head gaze of the user, based on: a current head gaze relative to a position of shoulders of the user, a limitation of the head gaze of the user bounded by the shoulders position of the user, and a current eye gaze and eye movements of the user. The electronic device then sends a request to the server. The request requests tiles relating to the viewport for the impending time period, selected based on the predicted future head gaze of the user.

According to another aspect of embodiments herein, the object is achieved by a method performed by a server for handling a request for tiles relating to a viewport of an ongoing omnidirectional video stream. The ongoing omnidirectional video stream is provided by the server to be displayed to a user of an electronic device. The server receives a request from the electronic device. The request requests tiles relating to the viewport for an impending time period. The request comprises a future head gaze of the user predicted based on: a current head gaze relative to a position of shoulders of the user, a limitation of the head gaze of the user bounded by the shoulders position of the user, and a current eye gaze and eye movements of the user.

The server then selects, the requested tiles relating to the viewport for an impending time period, based on the predicted future head gaze of the user.

According to an aspect of embodiments herein, the object is achieved by an electronic device configured to requesting tiles relating to a viewport of an ongoing omnidirectional video stream. The ongoing omnidirectional video stream is adapted to be provided by a server to be displayed to a user of the electronic device. The electronic device further is configured to:

Predict for an impending time period, a future head gaze of the user in relation to a current head gaze of the user, based on:
  the current head gaze relative to a position of shoulders of the user,
  a limitation of the head gaze of the user bounded by the shoulders position of the user, and
  a current eye gaze and eye movements of the user, and
  send a request to the server, which request is adapted to request tiles relating to the viewport for the impending time period, to be selected based on the predicted future head gaze of the user.

According to another aspect of embodiments herein, the object is achieved by a server configured to handle a request for tiles relating to a viewport of an ongoing omnidirectional video stream. The ongoing omnidirectional video stream is adapted to be provided by the server to be displayed to a user of an electronic device. The server further is configured to:

Receive a request from the electronic device, which request is adapted to request tiles relating to the viewport for an impending time period, and which request is adapted to comprise a future head gaze of the user to be predicted based on:
  a current head gaze relative to a position of shoulders of the user,
  a limitation of the head gaze of the user bounded by the shoulders position of the user, and
  a current eye gaze and eye movements of the user, and
  select for an impending time period, the requested tiles relating to the viewport, based on the predicted future head gaze of the user.

Thanks to that the prediction of the future head gaze for the impending time period, is based on the current head gaze relative to a position of shoulders of the user, the limitation of the head gaze of the user bounded by the shoulders position of the user, and the current eye gaze and eye movements of the user, the amount of bandwidth required for the requested tiles to accomplish a good experience for the user is reduced. This thus results in an improved experience for the user and decreased requirement of bandwidth when streaming omnidirectional video in a communications network.

BRIEF DESCRIPTION OF THE DRAWINGS

Examples of embodiments herein are described in more detail with reference to attached drawings in which:

FIG. 5 is a flowchart depicting embodiments of a method in an electronic device.
FIG. 6 is a flowchart depicting embodiments of a method in a server.

DETAILED DESCRIPTION

Embodiments herein relates to a method that based on a current head gaze provides an improved prediction of a future head gaze in an impending time period, to be used for selecting tiles of an ongoing omnidirectional video stream for the impending time period. The prediction according to the embodiments herein is improved since it is based on two additional biometric signals. These additional biometric signals are the position of the shoulders and eye movements of a user of an electronic device such as a VR HMD.

Figure 2:
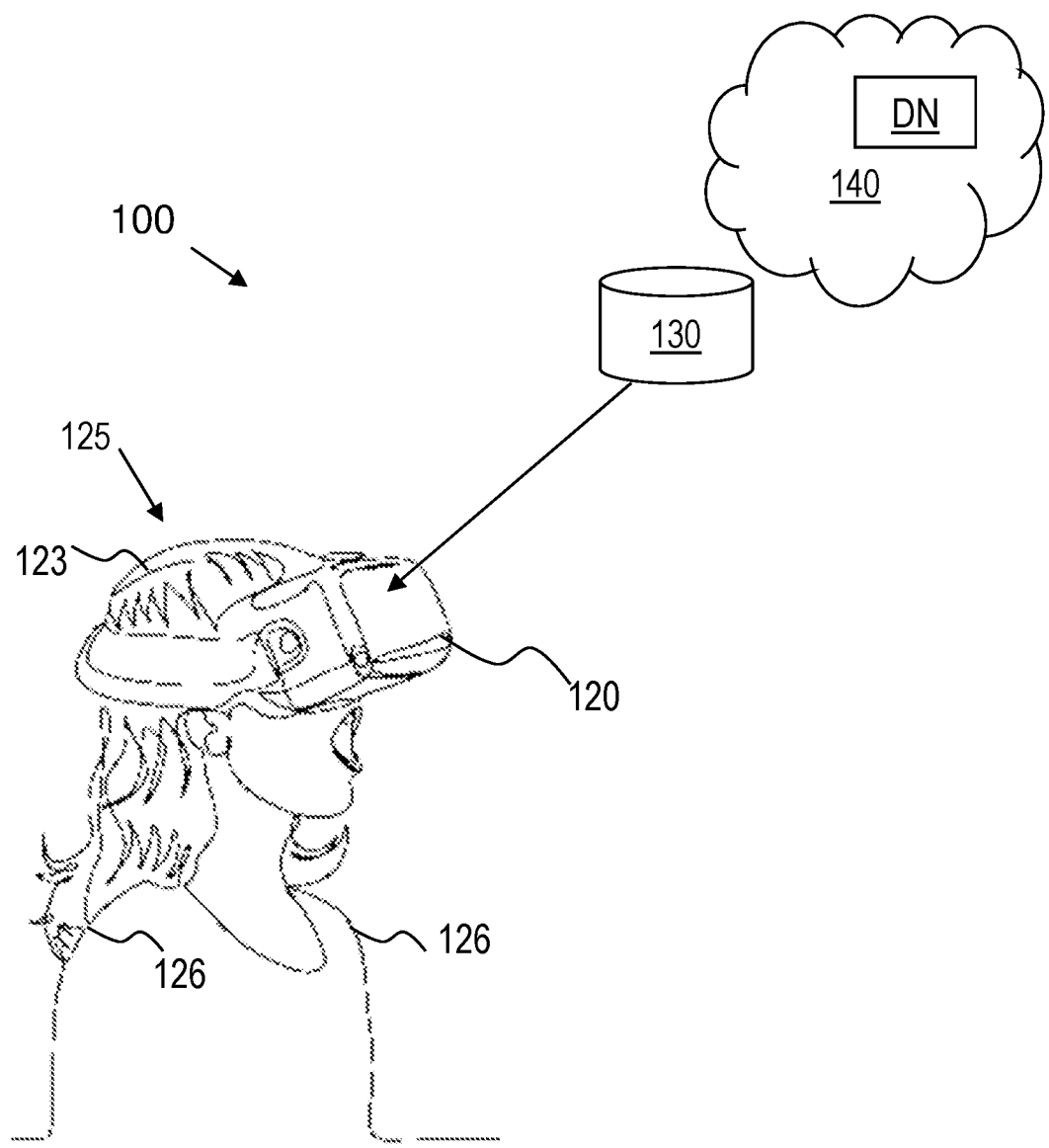
FIG. 2 is a schematic block diagrams illustrating embodiments of a communications network.

FIG. 2 is a schematic overview depicting a communications network 100 wherein embodiments herein may be implemented. The communications network 100 comprises one or more RANs and one or more CNs. The communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Data Over Cable Service Interface Specification (DOCSIS) networks, Digital Subscriber Line DSL networks, Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Electronic devices operate in the communication network 100, e.g. an electronic device 120 depicted in FIG. 2. The electronic device 120 may e.g. be mounted on a head 123 of a user 125. Shoulders 126 of the user 125 is also depicted in FIG. 2. The electronic device 120 may e.g. be a VR HMD.

In some embodiments the electronic device 120 accessible to a head mounted device and may rule the head mounted device. This may also be referred to as the electronic device 120 may control the head mounted device such as being a remote control for the head mounted device. It may in that case e.g. be a wireless device such as e.g. a mobile station, capable of communicate via one or more Access Networks (AN), e.g. Radio Access Network (RAN), to one or more core networks (CN). It should be understood by the skilled in the art that "wireless device" is a non-limiting term which means any terminal, wireless communication terminal, user equipment, smart phone, laptop, mobile phone, sensor, relay, mobile tablets or even a small base station communicating within a cell.

The electronic device 120 may display omnidirectional video to the user 125 or in case of controlling the head mounted device, the head mounted device may display omnidirectional video to the user 125.

The electronic device 120 communicates with a server 130 in the communications network 100, e.g. in client server way. The server 130 may e.g. be a media server. Omnidirectional videos may be streamed from the server 130 to the electronic device 120, e.g. in the form of tiles transmitted from the server 130 to the electronic device 120.

Methods herein may be performed by the electronic device 120 and the server 130. As an alternative, a Distributed Node (DN) and functionality, e.g. comprised in a cloud 140 as shown in FIG. 2, may be used for performing or partly performing the methods.

The server 130 may e.g. be an edge or cloud server e.g. in the cloud 140.

Example embodiments provided herein consider two additional biometric signals and use them to determine tiles relating to a viewport for an impending time period, e.g. comprising regions outside of the current field of view to be requested. The two additional biometric signals comprise the position of the shoulders 126 and eye movement of the user 125. The additional biometric signals is e.g. based on two conclusions: the movement of the eyes of the user 125 is used to predict the movement of the head 123 of the user 125. This is since a person's head movement is preceded by eye movements along the same direction. Further, a user's head gaze 425, (in FIG. 4), is limited by the shoulder position of the user 125, i.e. the position of the head 123 relative to the position of the shoulders 126. This is since the human head cannot rotate past the shoulders, or only a little bit past the shoulders. Any rotation of the head gaze past this point is only possible with the rotation of legs or hips which are slower, hence allows the fetching of content in sufficient time without introducing any black holes. According to embodiments herein, sensors may therefore be included to identify the head gaze relative to the shoulders, and identify eye gaze and eye movements.

The above described problem is addressed in a number of embodiments, some of which should be seen as alternatives, while some may be used in combination.

Figure 3:
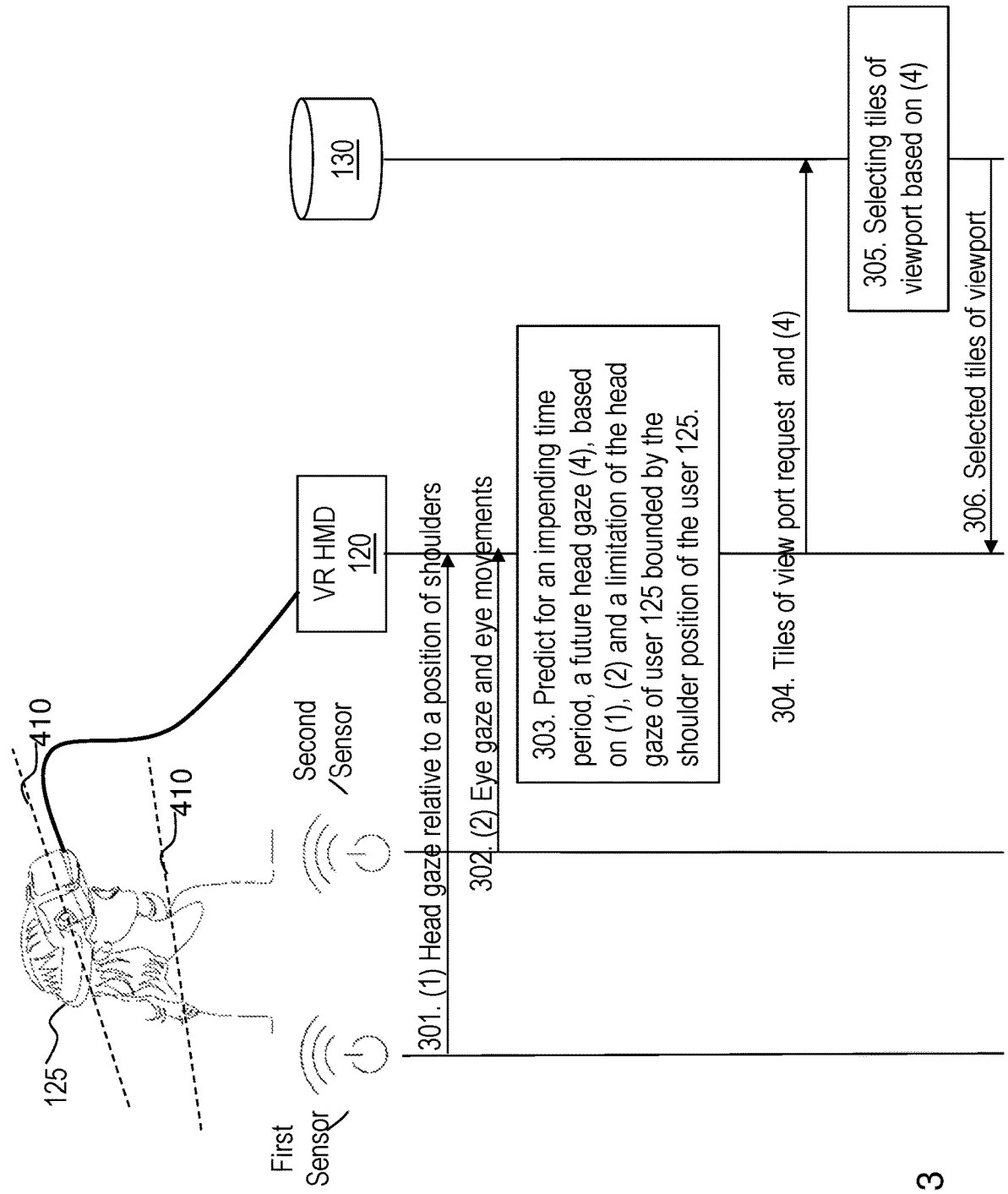
FIG. 3 is a combined flowchart and signalling diagram depicting embodiments of a method.

FIG. 3 depicts a combined flowchart and signalling diagram of an example of a method according to embodiments herein for requesting tiles relating to a viewport of an ongoing omnidirectional video stream provided by the server 130 to the user 125 of the electronic device 120. The wording "tiles related to a viewport" means a video stream including tiles within the viewport but also tiles that resides both outside and inside the viewport, and in in the neighborhood of the viewport, i.e. a video stream including tiles that more than strictly fits into the viewport.

The method may comprise the following actions:

Action 301

One or more first sensors sense a head gaze and a position of shoulders of user 125. The one or more first sensors may e.g. comprise one sensor sensing the head gaze of the user 125, such as an Inertial Measurement Unit (IMU) and another sensor sensing the position of the shoulders 126 of the user 125. As an alternative, the one or more first sensors may comprise only one sensor sensing both the head gaze of the user 125 and the position of the shoulders 126 of the user 125. One or more external sensors comprising vision and depth sensors may be used to simultaneously sense the head gaze, shoulder position, and relative positions. Information relating to (1) the head gaze relative to a position of the shoulders 126 of the user 125 is transferred from the one or more first sensors to be obtained in the electronic device 120. In some embodiments, information relating to (1) the head gaze and information relating to the position of the shoulders 126 of the user 125 is transferred from the one or more first sensors to be obtained in the electronic device 120. In that case the head gaze relative to a position of the shoulders 126 of the user 125 is determined in the electronic device 130 based on the obtained information, information relating to (1) the head gaze and the position of the shoulders 126.

A head gaze of the user 125 when used herein means the position, orientation, and direction of the user's 125 head. The head gaze may be stored in spherical or any other coordinate system.

A position of the shoulders of the user 125 when used herein means the normal position of the user's 125 shoulder without movement, and the frontal axis that passes through it.

Action 302

One or more second sensors sense eye gaze and eye movements of the user 125. The one or more second sensors may e.g. comprise one sensor sensing the eye gaze of the user 125 and another sensor sensing the eye movements of the user 125. As an alternative, the one or more second sensors may comprise only one sensor sensing both the eye gaze of the user 125 and the eye movements of the user 125. The same sensor that measures gaze may be used to measure the movement. Whereby a movement may be defined as change in position over time; e.g. a Euclidean Vector may be used.

Information relating to (2) eye gaze relative to the eye movements is transferred from the one or more second sensors to be obtained in the electronic device 120.

Eye gaze of the user 125 when used herein means the direction of the user's 125 gaze, which may be relative to the eye-gaze sensor or relative to the real world.

An eye movement of the user 125 when used herein means the saccades, i.e. the magnitude and direction in which the user's 125 eyes move.

Action 303

To find out which tiles of viewport to request for an impending time period, a future head gaze for that impending time period need to be predicted. According to embodiments herein, the electronic device 120 thus predicts for the impending time period, a future head gaze (4), based on (1), (2) and a limitation of the head gaze of user 125 bounded by the shoulder position of the user 125. This will give a more reliable prediction compared to prior art as described above. This is since the prediction is based on the two additional biometric signals comprising the position of the shoulders 126, the eye movement of the user 125, and the two conclusions that the movement of the eyes of the user 125 is used to predict the movement of the head 123 of the user 125 and that the user's head gaze 425 is limited by the shoulder position of the user 125, i.e. the position of the head 123 relative to the position of the shoulders 126. The more reliable prediction means that less tiles need to be requested.

An advantage with embodiments herein is that they reduce the amount of bandwidth required to accomplish the same user experience. Present-day solutions rely on equal amount of "buffer space" in all directions of the user's gaze, with the implicit assumption that all directions of gaze are equally valid. However, equal amount of "buffer space" in all directions of the user's gaze is not needed. If the user's 125 head gaze is to the extreme left, even more than depicted in FIG. 4c, in relation to the front-facing upper body, i.e. the shoulders position, then it will be faster to glance to the right than to the left. Glancing to the right only requires a move of the neck which is a faster muscle; glancing even further to the left requires a movement of the shoulders 126, hips, or feet, of the user 125, all of which takes longer.

The head 123 follows the eyes. Therefore if the eyes are moving towards the left, then the buffer space to the right of the viewport is pointless and constitutes a waste of bandwidth. Correspondingly if it is known that the head only follows the eyes, then the size of the buffers may be reduced as it would be possible to request for the right frames just before they are needed.

In the event that the user's head gaze moves without their eye gaze moving, then that is still not a problem for the prediction, as the regions that recently entered the field of view is not in their fovea, and is therefore not where they are focused on anyway; a reduced resolution would not be noticed.

Action 304

The electronic device 120 then sends a request to the server 130. The request comprises in this example, the predicted head gaze (4), and requests tiles relating to the viewport for the impending time period, to be selected by the server 130 based on the predicted head gaze of the user 125.

Action 305

The server 130 then selects the tiles relating to the viewport based on the predicted head gaze (4) according to the request. The tiles are selected for the viewport corresponding to the predicted head gaze of the user. Since the prediction is quite reliable, the amount of tiles in the neighborhood of the viewport need not be so extensive. The amount of tiles that is needed may vary. It may depend on a projection map being used and the resolution of the tiles content being used for the tile selection. As an example, for equirectangular projection maps, the tiles will be very close together at the poles and there will be much more tiles in the viewport. The equirectangular projection maps are also referred to as the equidistant cylindrical projection, geographic projection, or la carte parallélogrammatique projection maps. At the equator, the tiles will be more spread out. It also depends on the source resolution. For the overall tiles, for 8 Kilo pixels (K) resolution content 32 columns×16 rows, 4K 16×8, 2K 8×4 and 1K 4×2 is used. This will be used as an example. For 8K highest quality content using a cube map projection format where all tiles are placed evenly, assume a total of 512 tiles. For a headset with 110 degree Field of View (FoV), assume it covers 20% of the 360 space. This will assume 103 tiles to cover the viewport. For 4K totaling 128 tiles, it would be required ~26 tiles to cover the viewport. If it is wanted to slightly extend past the viewport, it may go with 30% coverage and the calculations would go slightly higher on the number of tiles to select.

The amount of tiles that is needed may e.g. be just one when one tile is the minimum required to fill the viewport within the time specified Action 306

The selected tiles of viewport are then sent by the server 130 to the electronic device 120 to be displayed to the user 125.

Figures 1, 4D:
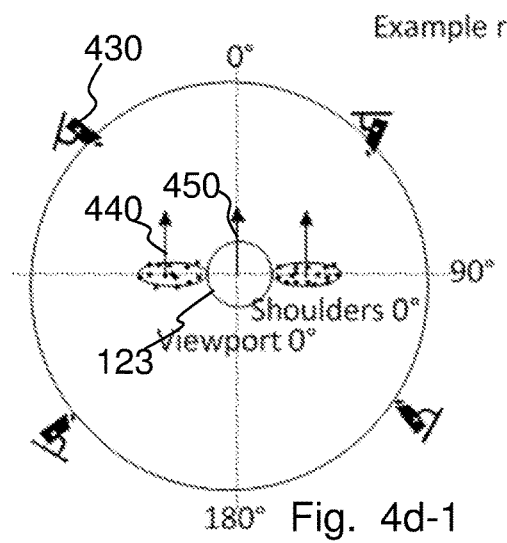
Figures 2, 4D:
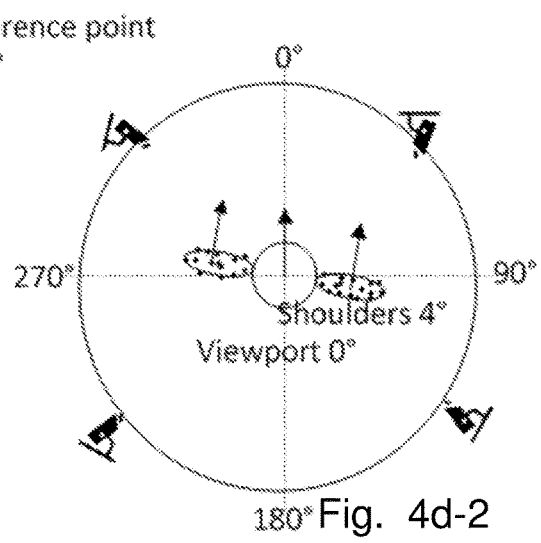
Figures 3, 4D:
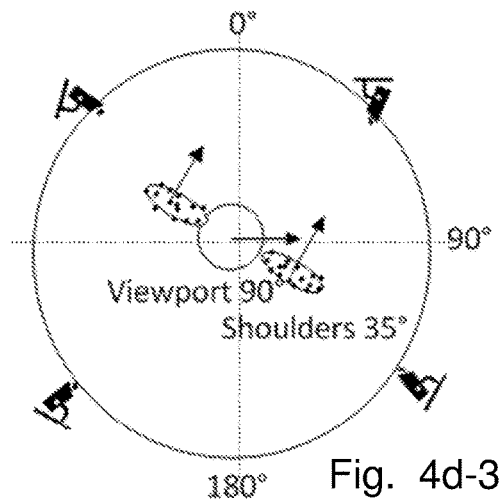
Figures 4, 4D:
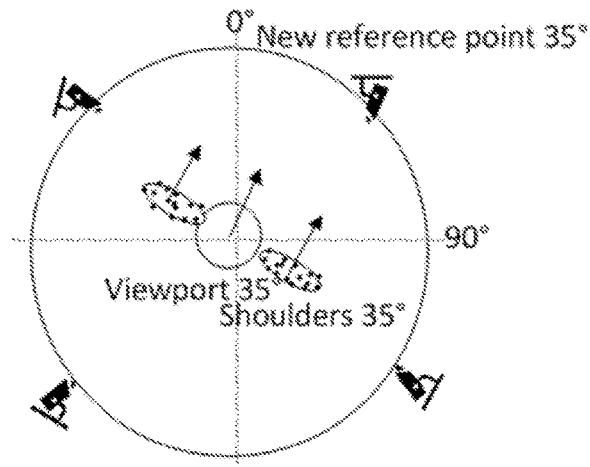
FIGS. 4 a, b and c are a schematic block diagram illustrating embodiment herein. d-1 to d-4 are schematic views illustrating four example scenarios of a head gaze, viewport direction relative to a position of the shoulders of the user in the prediction of a future head gaze of the user.

FIGS. 4 a, b and c depicts schematic views of the user 125 in different views and scenarios. It should be noted that FIGS. 4a, b and c only depicts the movement of the head gaze edgeways. However, according to embodiments herein, the head gaze of the user 125 may of cause also turn upwards like looking to the sky and downwards such as looking on the floor, and also here be limited by the shoulders' positions. E.g. see FIG. 3, where the line 410 hints that the head gaze of the user 125 is slightly turned upwards.

The head gaze of the user 125 may also turn edgeways and upwards, and further, edgeways and downwards, etc.

FIG. 4a illustrates a schematic view of the user 125 seen from the front. FIG. 4a shows the head 123 of the user 125 and the shoulders 126 of the user 125. An axis 410 ranges along the two shoulders 126 of the user 125 and illustrates the position of shoulders 126 of the user 125.

FIG. 4b illustrates a schematic view of the user 125 corresponding to FIG. 4a but now seen from above. FIG. 4b shows the head 123, the nose 420 and the shoulders 126 of the user 125. FIG. 4b further illustrates the head gaze of the user 125 represented by an arrow 425. The axis 410 ranges along the outer points of the two shoulders 126 of the user 125 and illustrates the position of shoulders 126 of the user 125. FIG. 4b illustrates an example scenario of a head gaze relative to a position of shoulders of the user 125. In FIG. 4b the current position of shoulders 126 represented by the axis 410 forms an angle with the current head gaze of the user 125 represented by the arrow 425 that in this scenario is 90 degrees. The limitation of a future head gaze of the user 125 bounded by the shoulders position of the user 125 may e.g. assumed to be that the head gaze is edgeways limited to turning the head gaze so that the head gaze arrow 425 coincide with the position of shoulders axis 410, i.e. it is possible to turn the head gaze an angle $\beta$ to the right and an angle $\alpha$ to the left.

It may for example be assumed that a person's head rotation has a range of 180 degrees, then in the scenario of FIG. 4b, it can be seen that head gaze can only be turned 90 degrees to the right, i.e. the angle $\beta$ is limited to up to 90 degrees, and head gaze can only be turned 90 degrees to the left, i.e. the angle $\alpha$ is limited to up to 90 degrees.

FIG. 4c is a schematic view illustrating an example scenario of a head gaze relative to a position of the shoulders of the user 125. The schematic view of FIG. 4c corresponds to FIG. 4b but here the current position of shoulders 126 represented by the axis 410 forms an angle with the current head gaze of the user 125 represented by the arrow 425, is about 45 degrees.

In the scenario of FIG. 4c, it can be seen that head gaze can be turned about 135 degrees to the right, i.e. the angle $\beta$ is limited to up to 135 degrees, but head gaze can only be turned about 45 degrees to the left, i.e. the angle $\alpha$ is limited to up to 45 degrees.

FIG. 4d shows a schematic view illustrating four example scenarios 4d1, 2, 3 and 4 of a head gaze, viewport direction relative to a position of the shoulders of the user 125 in the prediction of a future head gaze of the user 125 in relation to a current head gaze of the user. This is for a 360 degrees VR video. In each example scenarios there are four sensors represented by cameras 430. In the example scenarios in these figures the shoulders direction 440 is perpendicular to the shoulder axis 410 as mentioned above. Further, in the example scenarios in these figures the head gaze direction corresponds to the viewport direction 450. The reference numbers are only shown in the first scenario In FIG. 4d-1, but are corresponding in the other scenarios in FIGS. 4d-2, 3 and 4.

Figure 1:
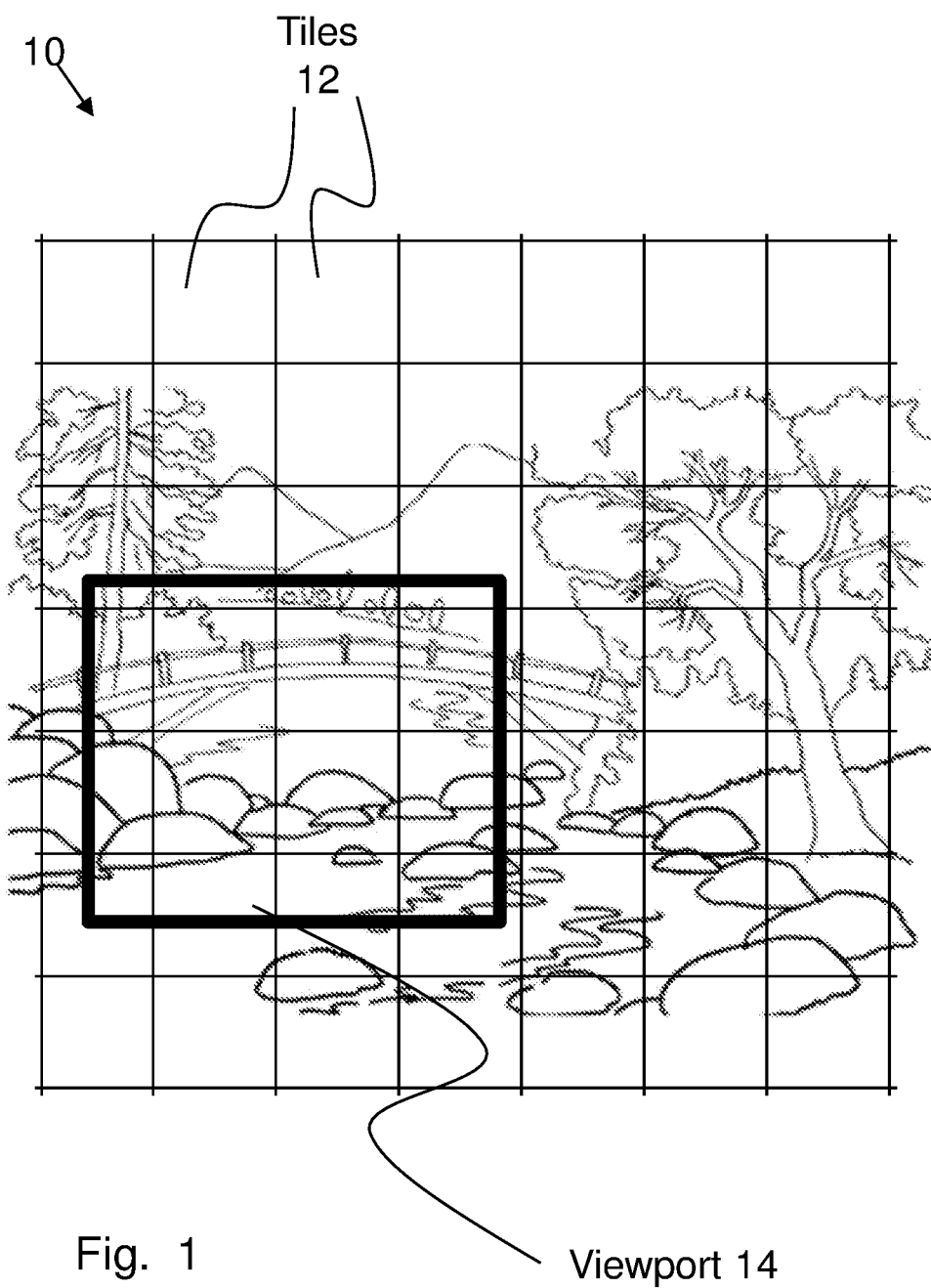
FIG. 1 is a schematic block diagram illustrating prior art.

In FIG. 4d-1, both the shoulders direction 440 and the viewport direction 450 are 0 degrees, this is a 0 degrees reference point of the 360 degrees video.

In FIG. 4d-2, the shoulders of the user 125 has turned to a direction 440 of 4 degrees but the head gaze and viewport direction 450 is still 0 degrees.

In FIG. 4d-3 the shoulders of the user 125 has turned further to a direction 440 of degrees and the head gaze and viewport has turned to a direction 450 of 90 degrees.

In FIG. 4d-4 the shoulders of the user 125 is still in a direction 440 of 35 degrees but the head gaze and viewport has turned to a direction 450 of 35 degrees, this is a new reference point of 35 degrees of the 360 degrees video.

Sensors

In some embodiments, sensors are arranged on the electronic device 120, such as a VR HMD, that allows data that is required for requesting relevant tiles relating to a viewport of an ongoing omnidirectional video stream that is provided by the server 130 to the user 125 of the electronic device 120. It is provided one or more sensors that allow head gaze data, eye gaze data, and shoulder position to be collected in the electronic device 130. The sensors for head gaze data may be placed on the electronic device 120, e.g. the VR HMD such as with Inertial Measurement Units (IMU), accelerometers, gyroscopes, magnetometers, etc, or externally such as cameras and depth sensors. External sensors may combine data with those from sensors, transmitters, or markers on the HMD. Eye gaze data may be built by positioning the sensors on the inside of the electronic device 120, e.g. the VR HMD with view of the user's 125 eyes, or on sensors worn directly by the user 125 by placing them on the eyes such as eye-tracking contact lenses, or a combination of both.

The sensors for shoulder position, according to embodiments herein, may be built by positioning the sensors at a bottom of the electronic device 120, such as a VR HMD HMDs. This is to be able to sense the position of the head 123 relative to the shoulders 126. It may also be used to identify different types of situation that causes a change in the aforementioned relative position. For example data from a sensor such as an accelerometer may be integrated to understand if the change in relative position is caused by a change in the user's 125 head gaze 425, or a change in the shoulder direction 410.

Sensors used to identify the shoulder positions may include visual sensors such as Red Green Blue-Depth (RGB-D)—cameras, monochromatic cameras, and Infra-Red (IR) cameras. An IR projector may be used alongside these sensors.

A RGB-D image provided by a RGB-D camera is simply a combination of a RGB image and its corresponding depth image. A depth image is an image channel in which each pixel relates to a distance between the image plane and the corresponding object in an RGB image.

The following describes the method as seen from the view of the electronic device 120. Example embodiments of the method performed by the electronic device 120 for requesting tiles relating to a viewport of an ongoing omnidirectional video stream will now be described with reference to a flowchart depicted in FIG. 5. The ongoing omnidirectional video stream is provided by the server 130 to be displayed to the user 125 of the electronic device 120. The electronic device 120 may e.g. be represented by a VR HMD, or be accessible to a VR HMD. This may mean that the electronic device 120 is a VR HMD, or have access to a VR HMD.

The method comprises the following actions which actions may be taken in any suitable order.

Action 501

The electronic device 120 may obtain the current head gaze relative to position of shoulders of the user 125, e.g. in the form of (x,y,z) coordinates.

The current head gaze relative to position of shoulders of the user 125 may be obtained based on biometric information from one or more first sensors sensing the head gaze and the position of shoulders of the user 125.

The one or more first sensors may be collocated with the electronic device 120.

Action 502

The electronic device 120 may obtain the current eye gaze and eye movements, comprising also 'saccades', of the user 125 e.g. in the form of a sliding window representing position over a fixed duration, which may be represented by a vector. The eye movements when used herein may also comprise saccades of the user 125. A saccade is a quick, simultaneous movement of both eyes between two or more phases of fixation in the same direction.

The current eye gaze and eye movements of the user 125 may be obtained based on biometric information from one or more second sensors sensing the eye gaze and eye movements of the user 125.

The one or more second sensors may be collocated with the electronic device 120.

Action 503

The electronic device 120 predicts a future head gaze of the user 125 in relation to a current head gaze of the user 125. Said future head gaze in relation to the current head gaze is predicted for an impending time period, and is based on:

the current head gaze relative to a position of shoulders of the user 125, a limitation of the head gaze of the user 125 bounded by the shoulders position of the user 125, and a current eye gaze and eye movements of the user 125.

Action 504

In some embodiments, the electronic device 120 may select the tiles relating to the viewport and a quality of the tiles based on the predicted future head gaze of the user 125. It may further be based on the required bandwidth.

Action 505

The electronic device 120 sends a request to the server 130. The request requests tiles relating to the viewport for the impending time period, selected based on the predicted future head gaze of the user 125.

In some embodiments, the server 130 will select the tiles relating to the viewport and its quality of the tiles, based on the predicted future head gaze of the user 125. The electronic device 120 then includes the predicted future head gaze in the request and requests the server 130 to select tiles relating to the viewport. Thus the request to the server 130 may comprise the predicted future head gaze of the user 125 to be used by the server 130 as a basis for selecting the tiles relating to the viewport and a quality of the tiles. Selecting the quality of the tiles when used herein e.g. means selecting the resolution, framerate, pixel density, color depth of the tiles.

The request may further comprise information about the current viewport, e.g. including current quality, eye gaze and eye movement. This is to allow the system to understand current user 125 experience, and if an upgrade is suitable in the context of current network conditions.

E.g., if the experience is currently at 80%, and the bandwidth between the server 130 and the electronic device 120 to go to is 100%, should it be performed? Well, it depends on the network, it may be enough bandwidth now, but that may just be a fluke, a temporary spike that is not sustainable. So instead of going from 80% to 100% then back to 80% once the network degrades again, it is better to just stick to 80% from an experience perspective.

The server 130 is comprised in the communications network 100, e.g. a managed network or an unmanaged network.

In the case of managed network, it may be that the bandwidth is sustainable over a longer period of time and a 20% buffer is not needed. In the case of an unmanaged network delivery, 25-30% may be a required buffer. For managed network delivery, it would be the network that makes the decision on when to notify of the available bandwidth. If this is done reliably, there is no reason in going to near 100% of the bandwidth available. It all comes down to the reliability of the reporting and how the network handles this.

In some other embodiments, the electronic device 120 may have selected the tiles relating to the viewport and its quality of the tiles based on the predicted future head gaze of the user 125. The electronic device 120 then requests these selected tiles from the server 130.

Action 506

The electronic device 120 may receive the requested tiles relating to the viewport of the omnidirectional video stream for the impending time period, selected based on the predicted future head gaze.

The following describes the method as seen from the view of the server 130. Example embodiments of a method performed by the server 130 for handling a request for tiles relating to a viewport of an ongoing omnidirectional video stream will now be described with reference to a flowchart depicted in FIG. 6. As mentioned above, the ongoing omnidirectional video stream is provided by the server 130 to be displayed to the user 125 of the electronic device 120. The electronic device 120 may e.g. be represented by a VR HMD, or be accessible to a VR HMD.

Action 601

The server 130 receives a request from the electronic device 120. The request requests tiles relating to the viewport for an impending time period. The request comprises a future head gaze of the user 125 predicted based on:

a current head gaze relative to a position of shoulders of the user 125,
a limitation of the head gaze of the user 125 bounded by the shoulders position of the user 125, and
a current eye gaze and eye movements of the user 125.

Action 602

The server 130 selects for an impending time period, the requested tiles relating to the viewport, based on the predicted future head gaze of the user 125.

The request may further comprise information about the current viewport. In this case, the selection of the requested tiles relating to the viewport for the impending time period, is further based on the current viewport.

In some embodiments, the selection, the requested tiles relating to the viewport for an impending time period, further comprises selecting a quality of the selected tiles.

Action 603

The server 130 may then send to the electronic device 120, the selected tiles relating to the viewport of the omnidirectional video stream for the impending time period.

Action 604

The server 130 may buffer the selected tiles relating to the viewport of the omnidirectional video stream for the impending time period. This may e.g. be performed when required or requested by network.

The method described above will now be further explained and exemplified.

The below text describes an example of the method by demonstrating how the biometric information may be collected and used herein. Since the context of this invention may be in videos, it is assumed that there exists a video stream, such as an ongoing omnidirectional video stream between the electronic device 120, e.g. by its media client, and the server 130.

1) Eye gaze data and eye movement data of the user 125 are collected from the one or more second sensors.

2) Head gaze data and shoulder 126 position data of the user 125 are collected from the one or more first sensors.

3) Head position, i.e. head gaze, relative to the position of the shoulders 126 is identified based on the head gaze data and shoulder position data.

The movement of the eyes of the user 125 is used to predict the movement of the head 123 of the user 125. Further, the head gaze is limited by the shoulder position of the user 125, i.e. the position of the head 123 relative to the position of the shoulders 126.

4) The most likely future head position, i.e. head gaze is predicted for the impending time period such as a time window t based on the eye gaze eye movement data and the head gaze relative to the position of the shoulders together with the limitation of the head gaze of the user 125 bounded by the shoulders 126 position of the user 125.

5) The predicted head positions and e.g. the current position of the viewport, is then sent in a request to the server 130. The server 130 may decide what encoding qualities to select the tiles from based the content in the request. This is directly related to the size of the tiles in Megabytes (Mbs) which will collectively fit into the bitrate available with the highest quality dedicated to the direct line of sight or viewport.

The encoded tiles are sent in user's 125 omnidirectional media stream.

Items 1, 2, may be streamed directly to an edge or cloud server such as the server 130. Items 3 4, and 5 may therefore be done in the edge/cloud server such as the server 130.

Alternative Embodiments

The embodiments above describe the one or more first and second sensors as outside-in internal sensors. Outside-in, i.e. external, sensors when used herein mean sensors that are physically outside of the electronic device 120 such as the VR HMD, which may be positioned in stationary stands or hand-held by another individual. It is also possible for at least one of the one or more first and second sensors to be inside-out, i.e. internal, sensor. Inside-out sensor when used herein means sensors that are on the user's electronic device 120 such as mounted within or above the electronic device 120 such as the VR HMD. The information collected from the outside-in sensors may be fused with information from inside-out sensors, or they may be treated individually. Information for the head gaze sensor, i.e. one of the one or more first sensors, may likewise be external if no head gaze sensors exist on the electronic device 120.

Outside-in sensors may also directly calculate the head gaze relative to the position of the shoulders instead of calculating this value independently based on two inputs, the head gaze data and the shoulder 126 position data as described above.

Video context may be used to predict eye gaze and head movement. Analytics may be collected from the user 125 using the embodiments herein to create a heat map of gaze in videos, e.g. to create the heat map from other users in the same context. If it is known how users usually gaze, then it may be optimized for this user 125. E.g. it may be predicted how the user 125 will turn his/her head based on his/her eye movements following previous patterns of users watching the same video.

This will allow future consumption of the same video to require less on-line processing, or to allow similar experience even for the user 125 if without shoulder tracking abilities.

In some embodiments described herein, the server 130 may decide on the quality such as the resolution to send down. An alternative is that the electronic device, such as its client decides on the quality and e.g. makes a request for higher resolution to the server 130.

Embodiments herein use a person's, i.e. the user's 125, biomechanical features and limitations to predict and limit which tiles that need to be prefetched and at what resolution. Biomechanical limitations include how much a user can or usually will move their eyes relative to their head, and head relative to their shoulders. Embodiments herein further use the user's 125 eye movement as a way to predict the impending head movement, and therefore may request for a higher resolution tile corresponding to where the head will be. The server 130 uses this prediction to pre-deliver higher resolution tiles so that there is a seamless experience, as opposed to one where they first see low resolution video which is then upgraded. The one or more first and second sensors may need to be added to typical present implementations to allow the method to collect shoulder position, using this information along with eye gaze position to better predict future head positions.

Figure 7A:
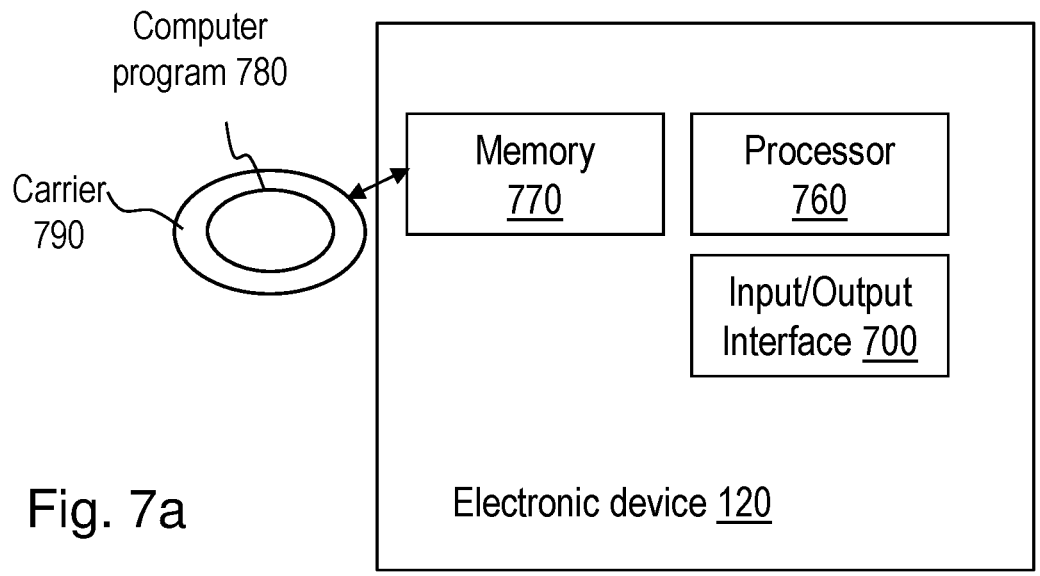
FIGS. 7 a and b are schematic block diagrams illustrating an embodiment of an electronic device.
Figure 7B:
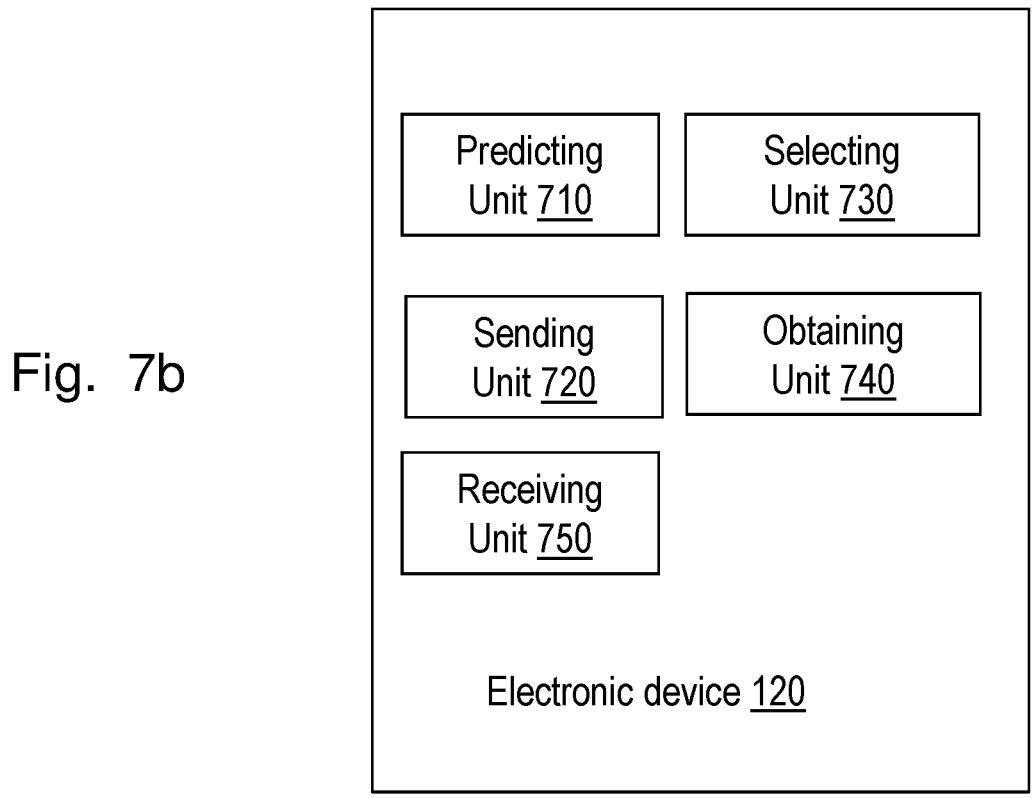

To perform the method actions above the electronic device 120 is configured to requesting tiles relating to a viewport of an ongoing omnidirectional video stream, and may comprise the arrangement depicted in FIGS. 7a and 7b. As mentioned above, the ongoing omnidirectional video stream is adapted to be provided by a server 130 to be displayed to a user 125 of the electronic device 120. The electronic device 120 may be e.g. adapted to be represented by a VR HMD, or the electronic device 120 may e.g. be accessible to a VR HMD.

The electronic device 120 may comprise an input and output interface 700 configured to communicate e.g. with the server 130. The input and output interface 700 may comprise a wireless receiver not shown and a wireless transmitter not shown.

The electronic device 120 is configured to, e.g. by means of a predicting unit 710 in the electronic device 120, predict for an impending time period, a future head gaze of the user 125 in relation to a current head gaze of the user 125, based on:
the current head gaze relative to a position of shoulders of the user 125,
a limitation of the head gaze of the user 125 bounded by the shoulders position of the user 125, and
a current eye gaze and eye movements of the user 125.

The electronic device 120 is further configured to, e.g. by means of a sending unit 720 in the electronic device 120, send a request to the server 130, which request is adapted to request tiles relating to the viewport for the impending time period, to be selected based on the predicted future head gaze of the user 125.

The request to the server 130 may adapted to comprise the predicted future head gaze of the user 125 to be used by the server 130 as a basis for selecting the tiles relating to the viewport and a quality of the tiles.

The request may further adapted to comprise information about the current viewport.

The electronic device 120 may further be configured to, e.g. by means of a selecting unit 730 in the electronic device 120, select the tiles relating to the viewport and a quality of the tiles based on the predicted future head gaze of the user 125.

The electronic device 120 may further be configured to, e.g. be performed by means of an obtaining unit 740 in the electronic device 120, obtain the current head gaze relative to position of shoulders of the user 125, and/or obtain the current eye gaze and eye movements of the user 125.

In some embodiments, the current head gaze relative to position of shoulders of the user 125 is adapted to be obtained based on biometric information from one or more first sensors sensing the head gaze and the position of shoulders of the user 125, and the current eye gaze and eye movements of the user 125 is adapted to be obtained based on biometric information from one or more second sensors sensing the eye gaze and eye movements of the user 125.

The one or more first sensors may be adapted to be collocated with the electronic device 120, and/or the one or more second sensors may be adapted to be collocated with the electronic device 120.

The electronic device 120 may further be configured to, e.g. by means of a receiving unit 750 in the electronic device 120, receive the requested tiles relating to the viewport of the omnidirectional video stream for the impending time period, selected based on the predicted future head gaze.

The embodiments herein may be implemented through a respective processor or one or more processors, such as the processor 760 of a processing circuitry in the electronic device 120, depicted in FIG. 7a together with computer program code for performing the functions and actions of the embodiments herein. The program code mentioned above may also be provided as a computer program product, for instance in the form of a data carrier carrying computer program code for performing the embodiments herein when being loaded into the electronic device 120. One such carrier may be in the form of a CD ROM disc. It is however feasible with other data carriers such as a memory stick. The computer program code may furthermore be provided as pure program code on a server and downloaded to the electronic device 120.

The electronic device 120 may further comprise a memory 770 comprising one or more memory units. The memory comprises instructions executable by the processor in the electronic device 120. The memory 770 is arranged to be used to store e.g. sensor data, information, tiles, data, configurations, and applications to perform the methods herein when being executed in the electronic device 120.

In some embodiments, a computer program 780 comprises instructions, which when executed by the at least one processor, cause the at least one processor of the electronic device 120, to perform the actions above.

In some embodiments, a carrier 790 comprises the computer program 780, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the electronic device 120 described above may refer to a combination of analog and digital circuits, and/or one or more processors configured with software and/or firmware, e.g. stored in the electronic device 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 8A:
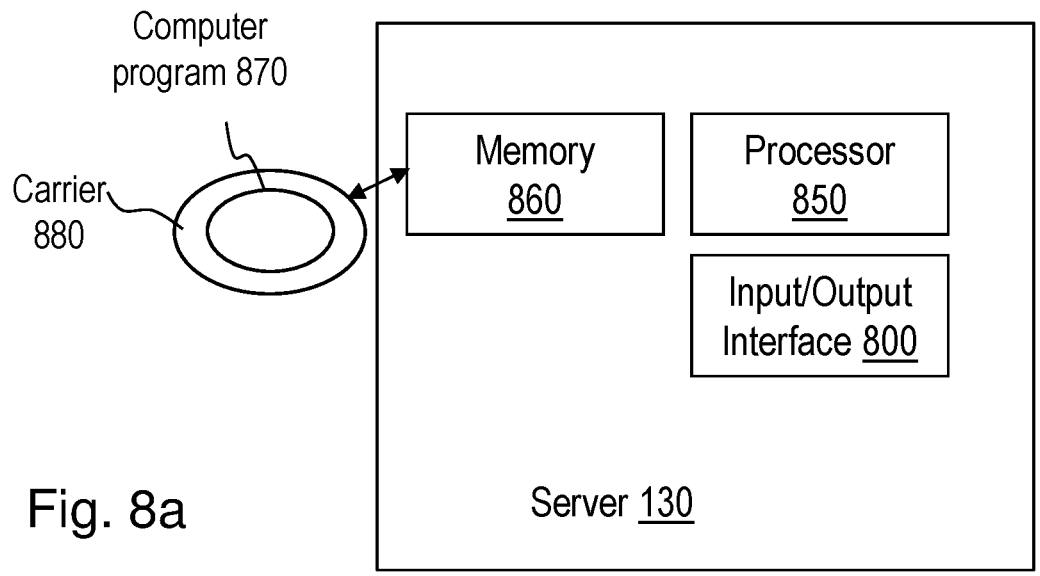
FIGS. 8 a and b are schematic block diagrams illustrating an embodiment of a server.
Figure 8B:
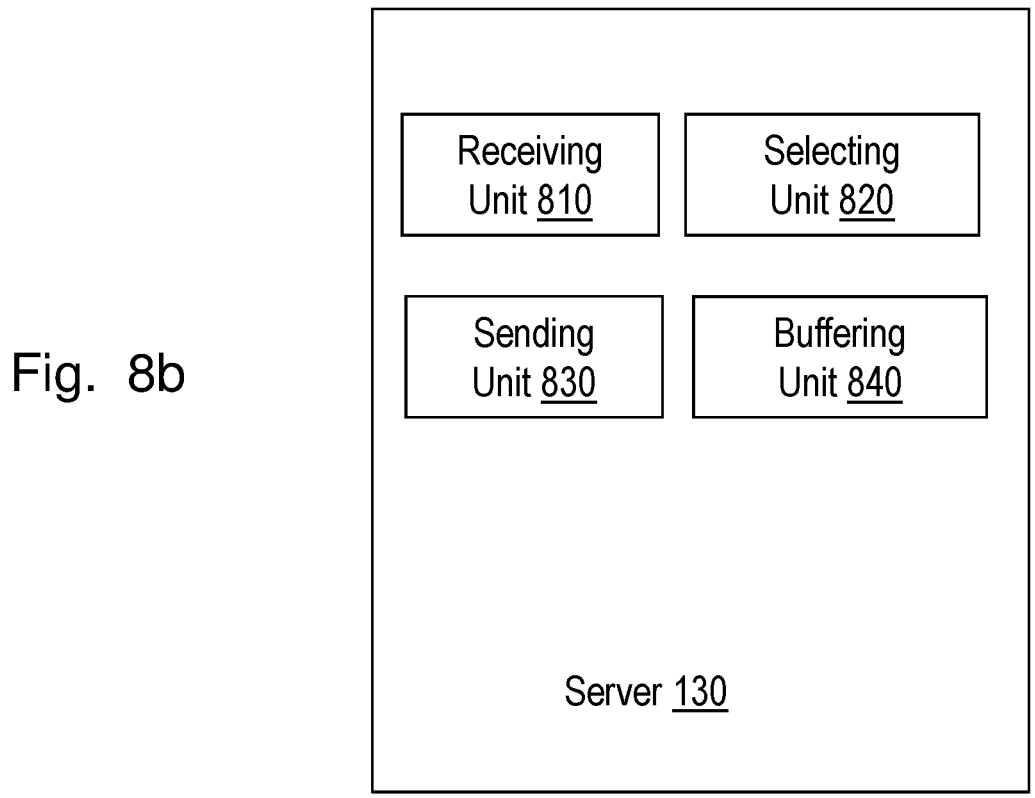

To perform the method actions above, the server 130 is configured to handle a request for tiles relating to a viewport of an ongoing omnidirectional video stream, and may comprise the arrangement depicted in FIGS. 8a and 8b. As mentioned above, the ongoing omnidirectional video stream is adapted to be provided by the server 130 to be displayed to a user 125 of an electronic device 120.

The server 130 may comprise an input and output interface 800 configured to communicate e.g. with the electronic device 120. The input and output interface 800 may comprise a wireless receiver (not shown) and a wireless transmitter (not shown).

The server 130 is further configured to, e.g. by means of a receiving unit 810 in the server 130, receive a request from the electronic device 120. The request is adapted to request tiles relating to the viewport for an impending time period. The request is adapted to comprise a future head gaze of the user 125 to be predicted based on:

a current head gaze relative to a position of shoulders of the user 125, a limitation of the head gaze of the user 125 bounded by the shoulders position of the user 125, and a current eye gaze and eye movements of the user 125.

The electronic device 120 may be e.g. adapted to be represented by a VR HMD, or the electronic device 120 may e.g. be accessible to a VR HMD.

The server 130 is further configured to, e.g. by means of a selecting unit 820 in the server 130, select for an impending time period, the requested tiles relating to the viewport, based on the predicted future head gaze of the user 125.

In some embodiments, the request further is adapted to comprise information about the current viewport. In these embodiments, the server 130 may further be configured to: e.g. by means of the selecting unit 820 in the server 130, select the requested tiles relating to the viewport for an impending time period, by further basing it on the current viewport.

The server 130 may further being configured to e.g. by means of the selecting unit 820 in the server 130, select the requested tiles relating to the viewport for an impending time period, and further selecting a quality of the selected tiles.

The server 130 may further be configured to, e.g. by means of a sending unit 830 in the server 130, send to the electronic device 120, the selected tiles relating to the viewport of the omnidirectional video stream for the impending time period.

The server 130 is further configured to, e.g. by means of a buffering unit 840 in the server 130, buffer the selected tiles relating to the viewport of the omnidirectional video stream for the impending time period.

The embodiments herein may be implemented through a respective processor or one or more processors, such as the processor 850 of a processing circuitry in the server 130, depicted in FIG. 8*a* together with computer program code for performing the functions and actions of the embodiments herein. The program code mentioned above may also be provided as a computer program product, for instance in the form of a data carrier carrying computer program code for performing the embodiments herein when being loaded into the server 130. One such carrier may be in the form of a CD ROM disc. It is however feasible with other data carriers such as a memory stick. The computer program code may furthermore be provided as pure program code on a server and downloaded to the server 130.

The server 130 may further comprise a memory 860 comprising one or more memory units. The memory comprises instructions executable by the processor in the server 130. The memory 860 is arranged to be used to store e.g. sensor data, information, tiles, data, configurations, and applications to perform the methods herein when being executed in the server 130.

In some embodiments, a computer program 870 comprises instructions, which when executed by the at least one processor, cause the at least one processor of the server 130, to perform the actions above.

In some embodiments, a carrier 880 comprises the computer program 870, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the server 130 described above may refer to a combination of analog and digital circuits, and/or one or more processors configured with software and/or firmware, e.g. stored in the server 130, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by an electronic device for requesting tiles relating to a viewport of an ongoing omnidirectional video stream that is provided by a server to be displayed to a user of the electronic device, the method comprising:

predicting, for an impending time period, a future head gaze of the user in relation to a current head gaze of the user based on:
  the current head gaze relative to a current position of shoulders of the user, and
  a current eye gaze and eye movements of the user,
  wherein predicting the future head gaze of the user comprises constraining the future head gaze to be within a future head gaze rotational angle range determined based on the current position of the shoulders of the user;

determining a quality of tiles to request from the server; and sending a request to the server requesting tiles relating to the viewport for the impending time period and that the tiles be selected based on the predicted future head gaze of the user, wherein the request to the server comprises the predicted future head gaze of the user and the determined quality.

2. The method of claim 1, further comprising:

selecting the tiles relating to the viewport and a quality of the tiles based on the predicted future head gaze of the user.

3. The method of claim 1, further comprising:

obtaining the current head gaze relative to position of shoulders of the user, and obtaining the current eye gaze and eye movements of the user.

4. The method of claim 1, wherein:

the current head gaze relative to position of shoulders of the user is obtained based on biometric information from one or more first sensors sensing the head gaze and the position of shoulders of the user, and the current eye gaze and eye movements of the user is obtained based on biometric information from one or more second sensors sensing the eye gaze and eye movements of the user.

5. The method of claim 4, wherein any one out of:
the one or more first sensors are collocated with the electronic device, or the one or more second sensors are collocated with the electronic device.

6. The method of claim 1, further comprising:
receiving the requested tiles relating to the viewport of the omnidirectional video stream for the impending time period, selected based on the predicted future head gaze.

7. The method of claim 1, wherein any one out of:
the electronic device is represented by a Virtual Reality Head Mounted Device, VR HMD, or
the electronic device is accessible to a VR HMD.

8. The method of claim 1, wherein the request further comprises information about the current viewport.

9. A method performed by a server for handling a request for tiles relating to a viewport of an ongoing omnidirectional video stream that is provided by the server to be displayed to a user of an electronic device, the method comprising:
receiving a request from the electronic device requesting tiles relating to the viewport for an impending time period, wherein the request comprises a quality of tiles and a future head gaze of the user to be predicted based on:
a current head gaze relative to a current position of shoulders of the user, and
a current eye gaze and eye movements of the user,
wherein the predicted future head gaze of the user is constrained to be within a future head gaze rotational angle range determined based on the current position of the shoulders of the user; and
selecting for an impending time period, the requested tiles relating to the viewport, based on the predicted future head gaze of the user and the quality in the request.

10. An electronic device configured to request tiles relating to a viewport of an ongoing omnidirectional video stream that is adapted to be provided by a server to be displayed to a user of the electronic device, the electronic device further being configured to:
predict, for an impending time period, a future head gaze of the user in relation to a current head gaze of the user based on:
the current head gaze relative to a current position of shoulders of the user, and
a current eye gaze and eye movements of the user,
wherein predicting the future head gaze of the user comprises constraining the future head gaze to be within a future head gaze rotational angle range determined based on the current position of the shoulders of the user;
determine a quality of tiles to request from the server; and
send a request to the server that is adapted to request tiles relating to the viewport for the impending time period and that the tiles be selected based on the predicted future head gaze of the user, wherein the request to the server comprises the predicted future head gaze of the user and the determined quality.

11. The electronic device of claim 10, further being configured to:
select the tiles relating to the viewport and a quality of the tiles based on the predicted future head gaze of the user.

12. The electronic device of claim 10, further being configured to:
obtain the current head gaze relative to position of shoulders of the user, and
obtain the current eye gaze and eye movements of the user.

13. The electronic device of claim 10, wherein:
the current head gaze relative to position of shoulders of the user is adapted to be obtained based on biometric information from one or more first sensors sensing the head gaze and the position of shoulders of the user, and
the current eye gaze and eye movements of the user is adapted to be obtained based on biometric information from one or more second sensors sensing the eye gaze and eye movements of the user.

14. The electronic device of claim 10, wherein any one out of:
the one or more first sensors are adapted to be collocated with the electronic device, and
the one or more second sensors are adapted to be collocated with the electronic device.

15. The electronic device of claim 10, further being configured to:
receive the requested tiles relating to the viewport of the omnidirectional video stream for the impending time period, selected based on the predicted future head gaze.

16. The electronic device of claim 10, wherein any one out of:
the electronic device is adapted to be represented by a Virtual Reality Head Mounted Device, VR HMD, or
the electronic device is accessible to a VR HMD.

17. The electronic device of claim 10, wherein the request further adapted to comprise information about the current viewport.

18. A server configured to handle a request for tiles relating to a viewport of an ongoing omnidirectional video stream that is adapted to be provided by the server to be displayed to a user of an electronic device, the server further being configured to:
receive a request from the electronic device requesting tiles relating to the viewport for an impending time period, wherein the request is adapted to comprise a quality of tiles and a future head gaze of the user to be predicted based on:
a current head gaze relative to a current position of shoulders of the user, and
a current eye gaze and eye movements of the user,
wherein the predicted future head gaze of the user is constrained to be within a future head gaze rotational angle range determined based on the current position of the shoulders of the user; and
select for an impending time period, the requested tiles relating to the viewport, based on the predicted future head gaze of the user and the quality in the request.

* * * * *